UNITED STATES PATENT OFFICE.

ADOLPH OTT, OF NEW YORK, N. Y., ASSIGNOR TO THOMAS F. WELLS, OF SAME PLACE.

IMPROVEMENT IN ARTIFICIAL STONES.

Specification forming part of Letters Patent No. 137,859, dated April 15, 1873; application filed March 27, 1873.

*To all whom it may concern:*

Be it known that I, ADOLPH OTT, of New York, in the county and State of New York, have invented certain Improvements in the Manufacture of Artificial Stone, of which the following is a specification:

The object of my invention is to produce by artificial means, and from materials readily obtainable, a stone which in hardness and durability will rival the very best building-stones at present employed. Like the Sorel stone, the béton-coignet, or the "apoenite" of Ransome, it can, while soft, be molded in any form, and by the addition of proper colors the brown-stone of Nova Scotia or of Connecticut is imitated so accurately that the eye can scarcely detect the difference.

The common process of using hydraulic mortar or cement (Portland cement, Roman cement, &c.) consists in incorporating with it sand, gravel, pebbles, &c., and mixing this compound with water into a plastic condition.

My process differs from the above in that certain ingredients are incorporated into that mixture or into the cement alone which, by proper manipulation, will impart to the setting mortar a greater degree of strength and hardness, and consequently durability, without increasing its cost in proportion. This being the case, it follows that my cement will bear a larger amount of inert material—sand, gravel, pebbles—than ordinary hydraulic cement without being deprived of strength and durability.

In order to secure these results I first procure hydraulic cement and introduce into one portion of it soluble silica and lime, and into another portion dolomite or magnesia limestone. The two portions are then mixed together after they have been both converted into a stiff paste. The first-named ingredients will form silicate of lime, one of the compounds upon which the value of hydraulic limes largely depends, while the other one, by merely being acted upon by water, assumes a degree of consistency not excelled by the very best English Portland stone.

The hydraulic cement referred to may either contain free lime or not, but I prefer a cement of the general formula: $10(SiO_2, R_2O_3) 22 CaO$, in which the letter R represents the aggregate quantity of alumina and oxide of iron contained in the cement. Next, I procure silex or minerals containing silex that is readily taken up by alkalies. The silex may either be artificially prepared or it may be a product of nature, such as flint, infusorial earth, or Tripoli slate, which, on account of their easy solubility in alkalies, are most sought after for the manufacture of soluble glass. Either one of these materials is mixed with the hydraulic cement in a proportion varying with the quantity of air-slaked lime introduced into the compound; the object being in all cases to produce a silicate of lime. The chemical equivalent of silica being 30.81, that of hydrated oxide of calcium 37, five parts in weight of soluble silica would therefore require exactly six parts in weight of slaked lime.

Supposing that the silex to be used only contains thirty-five per cent. of soluble silica and the slaked lime eighty-seven per cent. of hydrated lime, I must use for every hundred parts of the former $\frac{35 \times 6}{5} = \frac{90 \times 100}{87} = 103.5$ parts of the latter. The lime may either be air-slaked or slaked by aspersion with the minimum quantity of water, by which it will be reduced to an impalpable powder. It should be passed through a fine wire-screen to exclude all unslaked parts, and used within a day or two after slaking.

Into another portion of the hydraulic cement I introduce either dolomite or magnesian limestone. These materials before being used are gradually heated up to a red heat, (750° Fahrenheit,) which is maintained until the magnesia has lost the carbonic acid with which it has been combined. Should the temperature be increased, the carbonic acid of the carbonate of lime would also be expelled. This, however, is not desirable, since the cementing qualities of the magnesia would be lost by the large amount of burned lime present. In combination with water alone, this latter is not capable of furnishing a mortar of superior binding qualities.

When properly calcined these materials are reduced to a fine powder, so fine that ninety per cent. of it will pass a wire-sieve of thirtysix wires to the lineal inch. The two portions of hydraulic cement—namely, the one containing the silex and lime, and the other containing dolomite or magnesia limestone—are then mixed together and applied in the same manner as Portland cement or concrete. The mixing is most expeditiously effected in mixing-machines designed expressly for the purpose, and worked by steam-power.

I claim as my invention—

The compound for and process of manufacturing artificial stone, composed of hydraulic cement, silex or minerals containing silex readily soluble in alkalies, lime, and dolomite, substantially as described, and in the proportions set forth.

ADOLPH OTT.

Witnesses:
  HENRY FUCHRER,
  HENRY WEHLE.